US011967139B2

(12) United States Patent
Carmena et al.

(10) Patent No.: US 11,967,139 B2
(45) Date of Patent: Apr. 23, 2024

(54) ADVERSARIAL MASKS FOR FALSE DETECTION REMOVAL

(71) Applicant: ObjectVideo Labs, LLC, Tysons, VA (US)

(72) Inventors: Eduardo Romera Carmena, Tysons, VA (US); Gang Qian, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 547 days.

(21) Appl. No.: 17/319,426

(22) Filed: May 13, 2021

(65) Prior Publication Data

US 2021/0365739 A1    Nov. 25, 2021

Related U.S. Application Data

(60) Provisional application No. 63/026,874, filed on May 19, 2020.

(51) Int. Cl.

| G06V 10/82 | (2022.01) |
| G06F 18/21 | (2023.01) |
| G06F 18/214 | (2023.01) |
| G06N 3/04 | (2023.01) |
| G06N 3/08 | (2023.01) |
| G06V 10/764 | (2022.01) |

(52) U.S. Cl.
CPC ............ *G06V 10/82* (2022.01); *G06F 18/214* (2023.01); *G06F 18/217* (2023.01); *G06N 3/04* (2013.01); *G06N 3/08* (2013.01); *G06V 10/764* (2022.01)

(58) Field of Classification Search
CPC .... G06V 10/82; G06V 10/764; G06F 18/214; G06F 18/217; G06N 3/04; G06N 3/08; G06N 3/045; G06N 20/10
USPC ........................................................ 382/103
See application file for complete search history.

(56) References Cited

U.S. PATENT DOCUMENTS

| 9,858,496 | B2 * | 1/2018 | Sun ..................... G06F 16/5838 |
| 10,825,148 | B2 * | 11/2020 | Tagra ....................... G06T 7/13 |
| 11,409,977 | B1 * | 8/2022 | Glaser .................. G06K 7/1417 |
| 2020/0372301 | A1 * | 11/2020 | Kearney .............. G06V 10/764 |
| 2021/0004945 | A1 * | 1/2021 | Li ......................... G06V 10/993 |
| 2021/0319255 | A1 * | 10/2021 | Pham .................. G06F 18/2163 |

\* cited by examiner

*Primary Examiner* — Juan A Torres
(74) *Attorney, Agent, or Firm* — Fish & Richardson P.C.

(57) ABSTRACT

Methods, systems, and apparatus, including computer programs encoded on computer storage media, for false detection removal using adversarial masks. The method includes performing object detection on a first image that includes a first region using a detection model determining the detection model incorrectly classified the first region of the first image; generating an adversarial mask based on the first region of the first image and the detection model; obtaining a second image that includes the first region; generating a masked image based on the second image and the adversarial mask; and performing object detection on the masked image including the first region using the detection model.

20 Claims, 3 Drawing Sheets

┌─────────────────────────────────────────────────────────┐
    │  PERFORM OBJECT DETECTION ON A FIRST IMAGE INCLUDING A  │
    │   FIRST REGION USING A DETECTION MODEL        202       │
    └─────────────────────────────────────────────────────────┘
                               │
                               ▼
    ┌─────────────────────────────────────────────────────────┐
    │  DETERMINE THE DETECTION MODEL INCORRECTLY CLASSIFIED   │
    │      THE FIRST REGION OF THE FIRST IMAGE                │
    │                                               204       │
    └─────────────────────────────────────────────────────────┘
                               │
                               ▼
    ┌─────────────────────────────────────────────────────────┐
    │  GENERATE AN ADVERSARIAL MASK BASED ON THE FIRST REGION │
    │    OF THE FIRST IMAGE AND THE DETECTION MODEL  206      │
    └─────────────────────────────────────────────────────────┘
                               │
                               ▼
    ┌─────────────────────────────────────────────────────────┐
    │    OBTAIN A SECOND IMAGE THAT INCLUDES THE FIRST REGION │
    │                                               208       │
    └─────────────────────────────────────────────────────────┘
                               │
                               ▼
    ┌─────────────────────────────────────────────────────────┐
    │  GENERATE A MASKED IMAGE BASED ON THE SECOND IMAGE AND  │
    │          THE ADVERSARIAL MASK                 210       │
    └─────────────────────────────────────────────────────────┘
                               │
                               ▼
    ┌─────────────────────────────────────────────────────────┐
    │  PERFORM OBJECT DETECTION ON THE MASKED IMAGE INCLUDING │
    │    THE FIRST REGION USING THE DETECTION MODEL  212      │
    └─────────────────────────────────────────────────────────┘
                               │
                               ▼
    ┌─────────────────────────────────────────────────────────┐
    │  DETERMINE THE DETECTION MODEL CORRECTLY CLASSIFIED THE │
    │      FIRST REGION OF THE MASKED IMAGE         214       │
    └─────────────────────────────────────────────────────────┘
```

ADVERSARIAL MASKS FOR FALSE DETECTION REMOVAL

CROSS-REFERENCE TO RELATED APPLICATION

This application claims the benefit of U.S. Provisional Application No. 63/026,874, filed on May 19, 2020, the contents of which are incorporated by reference herein in its entirety.

BACKGROUND

Many properties are equipped with monitoring systems that include sensors and connected system components.

SUMMARY

In general, the subject matter described in this disclosure can be embodied in methods, apparatuses, and systems that generate masks used for false detection removal. In some implementations, an image is collected and sent to a detection engine and model. Based on the detection engine and model, a false detection is determined. Based on the false detection, an adversarial mask can be generated. The adversarial mask can be added to one or more images to improve detection by preventing a false detection or enabling a true or correct detection.

For example, the detection engine and model may determine that a bush in an image has been erroneously classified as a human and, in response, generate an adversarial mask for the portion of the image that shows the bush and add the adversarial mask to future images so that portions of those images that show the bush don't erroneously classify the bush as a human.

In general, adversarial techniques were traditionally conceived to attack or reduce the quality or accuracy of object detection. Related adversarial techniques are used here as an alternative to adjusting model parameters to remove or prevent false detections. In some implementations, an image is captured by a device at a property. For example, a surveillance camera at a property can capture a visual image of the property. The adversarial auxiliary image is produced based on a false detection within the image by a computer device using adversarial techniques such as fast gradient signed method (FGSM) to modify an input image.

The input image is modified by changing values of one or more elements within the input image such as pixels or groups of pixels. The values are changed to produce a corresponding change in the results of a detection algorithm performed on the input image. Portions of the modified input image corresponding to false detection can be used as a mask. The mask can be added to one or more new images to prevent false detections within corresponding portions of the one or more new images.

In some implementations, a given image contains a region that contains a false detection. For example, a region can include a tree that has been falsely identified as an animal based on a detection model. Instead of fixing the false identification with parameter changes of the detection model, an adversarial auxiliary image can be generated with values modified to produce corresponding changes in the results of the detection model. The portion of the adversarial auxiliary image that corresponds to the falsely identified tree can be cropped from the adversarial auxiliary image to create an adversarial mask. The adversarial mask can be added to any new image that contains the tree. The combined image based on a combination of a new image and the adversarial mask can be run through the detection model where the adversarial mask prevents the tree from being falsely identified as an animal.

In some implementations, a validation engine is used to determine whether a detection is false or not false. For example, a more robust, computationally intensive machine-learning model can be used to check the detections obtained from a less computationally intensive machine-learning model that performs initial object detection. In some cases, the more robust machine-learning model is a more specialized version of the machine-learning model that performs initial object detection. For example, the more robust machine-learning model can be trained to detect false detections or detect certain areas or types of visual data.

In some implementations, a user is prompted to aid in determining whether a detection is false or not false. For example, a validation engine or similar element can prompt a user with an image and a given detection obtained from a detection model corresponding to the image. The user can give feedback as to whether the detection is false or not false and the validation engine or similar element can either compute an adversarial mask accordingly or not compute an adversarial mask.

In some implementations, a user submits information obtained by an electronic device to a system that performs detections. For example, a user can take a picture with a smartphone of an element on a property and send a data signal to the system that performs detections. The user can include information related to the element on the property within the data signal. The system that performs detections can use the information to aid in detection of the element on the property.

In some implementations, images with multiple false detections are used to compute one or more adversarial masks. For example, an image containing a tree, a house, and a car, each falsely identified, can create three adversarial masks corresponding to each false identification that can be added to any new image that contains the corresponding element that has been falsely identified. The adversarial mask generated based on the false identification of the tree can be added to new images containing the tree. The adversarial mask generated based on the false identification of the house can be added to new images containing the house. The adversarial mask generated based on the false identification of the car can be added to new images containing the car. In general, any object detected using a detection model can have a corresponding adversarial mask generated.

In some implementations, other adversarial methods are used. For example, instead of FGSM, other algorithms such as limited-memory Broyden-Fletcher-Goldfarb-Shanno (L-BFGS) algorithm, the basic iterative method (BIM) or projected gradient descent (PGD), distributionally adversarial attack, Carlini and Wagner (C&W) attacks, Jacobian-based saliency map attack (JSMA), DeepFool among others, can all be used. Possible new algorithms or methods that rely on modifying an input image can also be used.

In some implementations, other loss functions are used. For example, classification losses such as hinge loss or multiple class support vector machines (SVM) loss, negative log likelihood, among others can all be used.

One innovative aspect of the subject matter described in this specification is embodied in a method that includes performing object detection on a first image that includes a first region using a detection model; determining the detection model incorrectly classified the first region of the first image, generating an adversarial mask based on the first region of the first image and the detection model, obtaining a second image that includes the first region, generating a masked image based on the second image and the adversarial mask, and performing object detection on the masked image including the first region using the detection model.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects the first image may include a plurality of pixels in the first region each defined by one or more values and generating the adversarial mask based on the first region of the first image and the detection model may include: calculating an output of a loss function for a first pixel of the plurality of pixels; and adjusting one or more values corresponding to the first pixel based on the output of the loss function.

In some aspects, actions include: calculating a gradient of the output of the loss function; and adjusting one or more values corresponding to the first pixel based on the output of the loss function and the gradient.

In some aspects, calculating the gradient of the output of the loss function may include: back-propagating the output of the loss function through the detection model.

In some aspects, adjusting the one or more values corresponding to the first pixel based on the output of the loss function and the gradient may include: generating a product by multiplying a sign of the gradient by a perturbation control variable; and adjusting the one or more values by adding the product of the sign of the gradient and the perturbation control variable to the one or more values.

In some aspects, the one or more values may include a green pixel value, a red pixel value, and a blue pixel value and adjusting the one or more values corresponding to the first pixel based on the output of the loss function may include: adjusting each of the green pixel value, the red pixel value, and the blue pixel value based on the output of the loss function.

In some aspects, the loss function may include calculating a binary cross entropy (BCE) loss and the output of the loss function may represent a BCE output.

In some aspects, generating the adversarial mask based on the first region of the first image and the detection model may include: generating an adversarial auxiliary image as a modified version of the first image by modifying values of one or more pixels of the first image; and generating the adversarial mask by extracting a region of the adversarial auxiliary image corresponding to a location of the first region within the first image.

In some aspects, the adversarial auxiliary image may include the same number of pixels as the first image.

In some aspects, generating the masked image based on the second image and the adversarial mask may include: adding one or more values associated with one or more pixels of the adversarial mask to one or more values associated with one or more pixels of the second image.

In some aspects, adding the one or more values associated with the one or more pixels of the adversarial mask to the one or more values associated with the one or more pixels of the second image may include: adding a red pixel value associated with a pixel of the adversarial mask to a red pixel value associated with a pixel of the second image; adding a green pixel value associated with the pixel of the adversarial mask to a green pixel value associated with the pixel of the second image; and adding a blue pixel value associated with the pixel of the adversarial mask to a blue pixel value associated with the pixel of the second image.

In some aspects, the first image and the second image may be obtained at a property by a camera. In some aspects, the detection model may be a machine-learning network trained for object detection. In some aspects, the first region may include: a representation of a first object that has been incorrectly classified.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
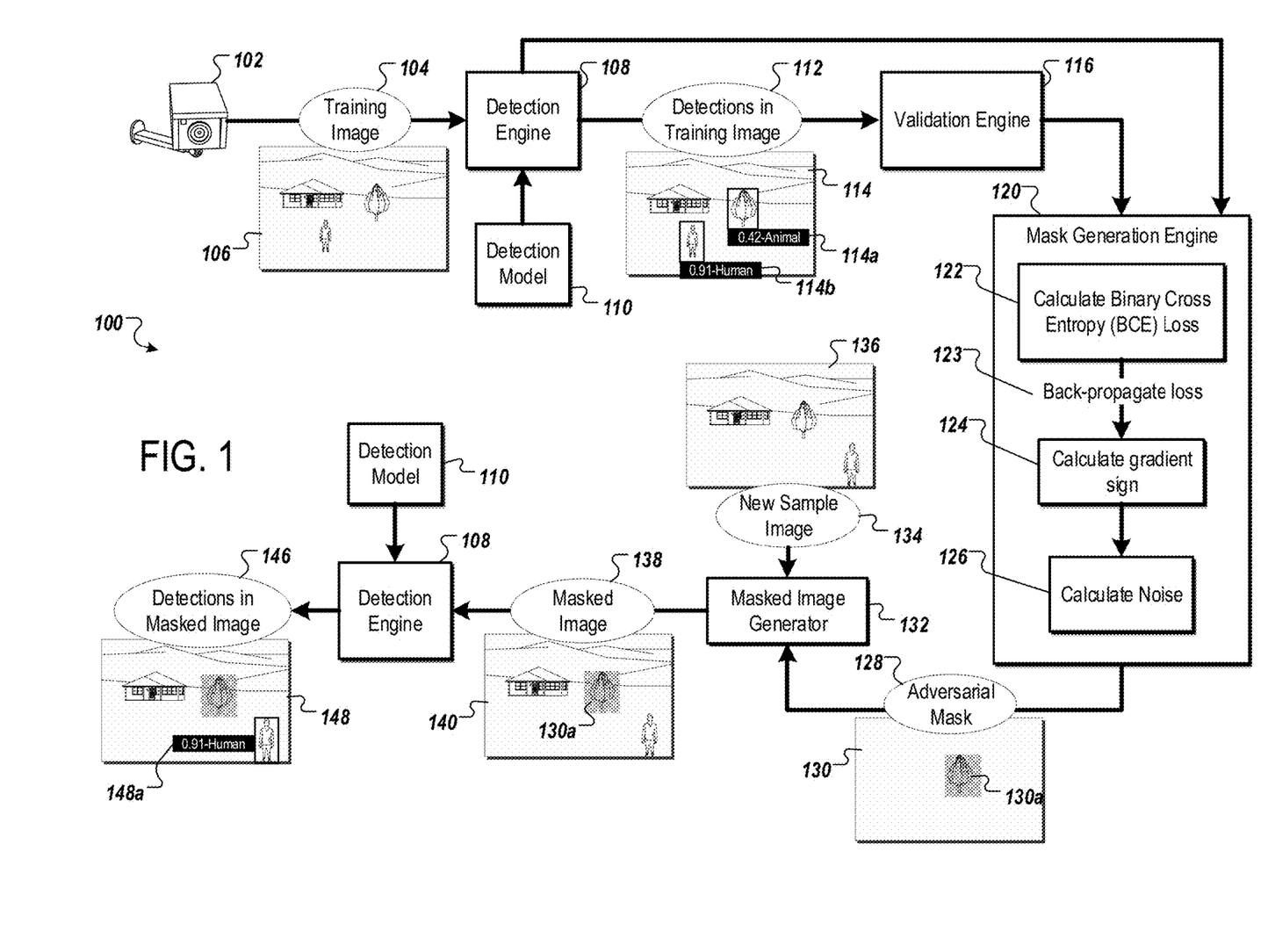
FIG. 1 is a diagram showing an example of a system for false detection removal using adversarial masks.

FIG. 1 is a diagram showing an example of a system 100 for false detection removal using adversarial masks. The system 100 includes an input source 102, a detection engine 108, and a detection model 110. The input source 102 is capable of capturing one or more visual images and supplying the one or more visual images to a detection engine 108. The detection engine 108 functions based on a detection model 110 designed to detect elements within a visual image. The system 100 further includes a validation engine 116, a mask generation engine 120, and a masked image generator 132.

The validation engine 116 is used to validate or invalidate the detection of one or more elements detected within the one or more visual images and send corresponding validation data to the mask generation engine 120. The mask generation engine 120 also receives data from the detection engine 108 corresponding to one or more detections made by the detection engine 108. The mask generation engine 120 produces an adversarial mask 128 that can be added to an image by the masked image generator 132 to remove specific false detections. The detection engine 108 and the detection model 110 are a form of machine-learning network trained for object detection.

The input source 102, in the example shown in FIG. 1, is a surveillance camera located on a property. The input source 102 is communicably connected to the detection engine 108. The input source 102 obtains a training image 104 and sends the training image 104 to the detection engine 108. The training image 104 is shown visually in item 106.

Figure 3:
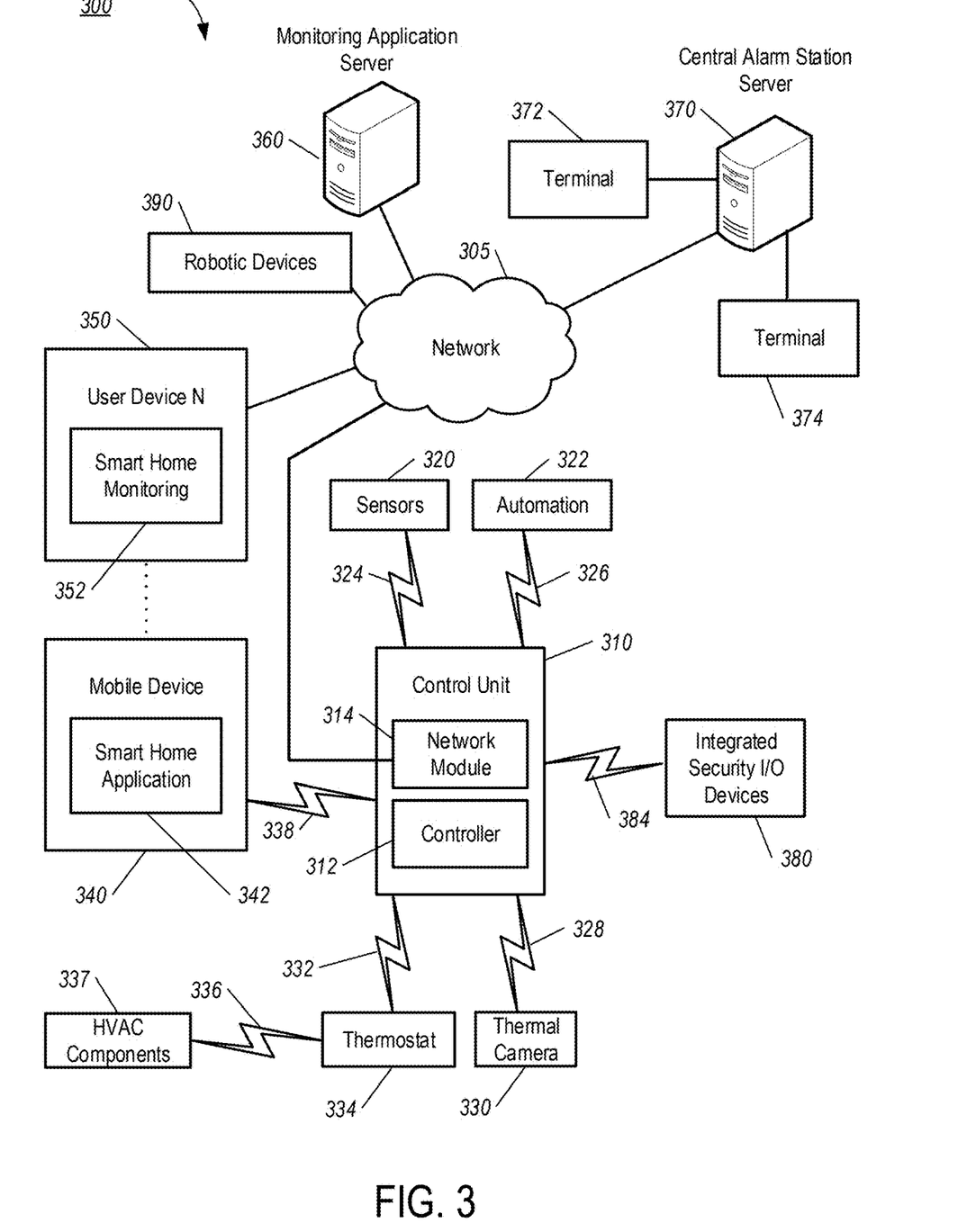
FIG. 3 is a diagram illustrating an example of a property monitoring system.

In some implementations, the input source 102 can be a data storage device or a device discussed in reference to FIG. 3 among others. For example, the input source 102 can be a database that stores one or more visual images. The database can then send images stored to the detection engine 108. For another example, a user smartphone or other personal electronic device can take an image of a scene and send the image to the detection engine 108. In general, any device able to obtain visual data may be used as an input source.

In some implementations, the training image 104 is a background image derived from an image obtained from the input source 102. For example, the input source 102 can obtain a first image. The first image can be processed to obtain only the background, and background objects, of the first image. The background image can be used as the training image 104.

In some implementations, the background of the first image can be obtained by a processing device. For example, the processing device can obtain two or more images from an input source such as the input source 102. The two or more images can contain a man walking across a lawn with trees behind. The two or more images can be processed by the processing device to determine the man is moving while the lawn, and the trees behind, are not moving. Based on the movement of the man relative to the lawn and trees, the processing device can determine that the lawn and the trees are part of a background image. The processing device can determine that the man is a non-background element and so should not be contained in the background image. The processing device can use thresholds or other logic so that a flag moving in the wind, or leaves of a tree among others, do not become registered as non-background elements.

In some implementations, the background is determined based on feedback from a user. For example, an image obtained by the input source 102 is shown to a user. The user can select portions of the image as background and portions of the image as non-background elements. The selections by the user can be used to determine the background of the image obtained by the input source 102 as well as similar images obtained by the input source 102 or other input sources in a system such as the system 100.

Selections by the user can similarly be recorded and used to inform subsequent determinations. For example, a new image obtained by the input source 102 or another input source in the system 100 can be processed by the detection engine 108. The detection engine 108 can be trained based on selections made by the user to improve detection of backgrounds within obtained images.

The detection engine 108 processes the training image 104 based on the detection model 110. The detection engine 108 produces detections 112 based on the training image 104. The detections 112 are visually shown in item 114. Detection regions 114a and 114b are shown with attached confidence values computed by the detection engine 108. The detection regions 114a and 114b include confidence values as well as identifiers. For example, the detection region 114a is identified as an animal with a confidence value of 0.42. The detection region 114b is identified as a human with a confidence value of 0.91.

The detections 112 are sent from the detection engine 108 to the validation engine 116. The validation engine is used to determine whether or not the detections made by the detection engine 108 are valid. The validation engine 116 can determine a subset of detections to be false or true based on given criteria or external input. In the example of FIG. 1, the validation engine uses a combination of confidence value thresholds and feedback from a user to determine that the detection region 114a is not valid. The detection engine 108 and the detection model 110 has incorrectly identified the tree in the training image 104 as an animal.

Data related to the false detection determination made by the validation engine 116 is sent to the mask generation engine 120. The mask generation engine 120 is an alternative to fine-tuning a given detection model based on false or invalid detections. In some cases, one or more visual images can include background objects that can be detected by machine-learning-based object detectors. In some cases, background objects are detected as foreground objects. In some cases, background objects or foreground objects are falsely identified. For example, the detection engine 108 detects a tree in the training image 104. The detection is shown in the detection region 114a. The tree is identified as an animal because the deep learning-based approach of the detection engine 108 has detected input values within the training image 104 leading to the false identification of an animal.

A false detection can be removed or prevented by adjusting parameters within the detection model 110. However, changing parameters to remove such false detections and produce a robust detection system may require more training data, in some cases, significantly more. Resulting retraining and data processing can be time consuming and computationally expensive. Instead of tuning or adjusting parameters, false detections may be removed by a mask generation engine such as the mask generation engine 120.

The mask generation engine 120 generates an adversarial mask based on a given false or invalid detection. The adversarial mask generates corresponding adversarial noise using adversarial techniques which can be combined with an image to alter detections within the image made by the detection engine 108. In conventional systems, adversarial noise may be a humanly-imperceptible perturbation that can be added to an image to trigger specific values or changes in a deep model so that the deep model wrongly detects or misses objects in the image. This adversarial technique can be used to worsen the performance or carry out an attack on a deep model. However, adversarial noise presents an opportunity to generate the sort of effective false detection masks described in this specification.

The mask generation engine 120 receives data related to the invalid detection determination made by the validation engine 116 based on the detection 112 obtained from the detection engine 108. The mask generation engine 120 further receives data from the detection engine 108. In the example of FIG. 1, the data received by the mask generation engine 120 includes bounding box coordinates for invalid detections determined by the validation engine 116 based on the detections 112 and an input image corresponding to the training image 104.

In some implementations, the input image is a background image that excludes foreground elements from the training image 104. For example, one or more other elements within the system 100 or communicably connected to the system 100 can be used to obtain the input image corresponding to the training image 104 by processing the training image 104.

In some implementations, the mask generation engine 120 directly receives the training image 104. The mask generation engine 120, can then, in some cases, further process the received training image 104. For example, the mask generation engine 120 can further process the training image 104 and use the further processed image to calculate an adversarial mask. In other cases, the mask generation engine 120 can directly process the training image 104 to calculate an adversarial mask.

In some implementations, the mask generation engine 120 receives other forms of input. For example, the mask generation engine 120 can receive only data from the detection engine 108 or only data from the validation engine 116. Depending on the implementation, the data received includes coordinates or other data related to the training image 104 or detections made based on the training image 104. In some cases, only the detections 112 that are determined invalid by the validation engine 116 are received. In some cases, all the detections 112 are received and each of the detections 112 has a corresponding identifier used to identify if a detection is invalid or valid, false, or not false.

In some implementations, the detections 112 include coordinates for each false detection detected within the training image 104. For example, the detection engine 108, which can be a form of deep object detector, obtains one or more coordinates that correspond to one or more of the detections 112. The detections 112 can include coordinates as well as a classifier for each detection. In some cases, a false detection object class can be used to distinguish one or more detections of the detections 112 as false detections. In some implementations, a first false detection includes the false detection object class, a first x coordinate, a first y coordinate, a second x coordinate, and a second y coordinate in a given two-dimensional (2D) x-y plane of the training image 104. The first x coordinate and the first y coordinate correspond to a corner of a bounding box that bounds a first false detection. The second x coordinate and the second y coordinate correspond to another corner of a bounding box that bounds the first false detection.

In some implementations, other shapes or identifiers are used to label or define the detections 112. For example, instead of boxes with at least four values corresponding to a first x and y coordinate pair and a second x and y coordinate pair, an oval can be used. A center coordinate point together with a radius length on either the semi-major or semi-minor axis or both can be included. Other common shapes including polygons can be used such as circles, triangles, pentagons, among others.

In some implementations, buffers around bounding shapes can be used. In some cases, shapes can be specified using pixel values or ranges. Bounding shapes can include absolute or relative buffers around particular regions of images. For example, a 2 percent pixel buffer for a rectangular bounding box around a tree can be used to fully capture the tree. Similarly, an absolute buffer of 3 pixels on each of the four sides of the rectangular bounding box can be used to fully capture the tree.

In some implementations, a shape informed by a process similar to the detection engine 108 is used to label or define the detections 112. For example, a tree shown in the training image 106 can be detected and a bounding box that labels or defines the detected tree can resemble the shape of the detected tree. In this way, bounding boxes can be dynamic and approximate the shape or appearance of elements which they bound.

For each false detection, the mask generation engine 120 calculates an adversarial perturbation image. The adversarial perturbation image is an altered version of the training image 104 or the input image used as input. The adversarial perturbation image is an altered version of the training image 104 when the mask generation engine 120 directly processes the training image 104. The adversarial perturbation image is an altered version of the input image when the mask generation engine 120, or another element in the system 100, processes the training image 104 to generate input for the mask generation engine 120. The adversarial perturbation image is calculated using the fast gradient sign method (FGSM). The adversarial perturbation image is then cropped based on the location of the given false detection to create an adversarial mask for the given false detection. The adversarial mask generation process includes elements shown within the mask generation engine 120 including calculations for binary cross entropy (BCE) loss (122), back-propagating the BCE loss through model (123), the gradient sign of the model based on the training image 104 (124), and the noise (126).

In some implementations, other adversarial methods are used. For example, instead of FGSM, other algorithms such as limited-memory Broyden-Fletcher-Goldfarb-Shanno (L-BFGS) algorithm, the basic iterative method (BIM) or projected gradient descent (PGD), distributionally adversarial attack, Carlini and Wagner (C&W) attacks, Jacobian-based saliency map attack (JSMA), DeepFool among others, can all be used. Possible new algorithms or methods that rely on modifying an input image can also be used.

The BCE loss 122 is calculated with regard to the false or invalid detections as determined by the validation engine 116. As discussed, the false detections include a class object that identifies the false detection as well as a location corresponding to the location of the false detection with regard to the input image or the training image 104. The BCE loss 122, in the example of FIG. 1, is a classification problem calculated with respect to the detection model 110 of the system 100 and the detections 112 of the training image 104. The BCE loss 122 is calculated as a loss function for each pixel used to produce a detection with a given image.

The BCE loss 122 is back-propagated through the detection model 110 of the system 100. By back-propagating the BCE loss 122, shown in item 123, the mask generation engine 120 determines gradients of the BCE loss 122. The gradients of the BCE loss 122 are determined with respect to the input image corresponding to the training image 104. The mask generation engine 120 uses the gradients within the process of adding noise to the input image.

In some implementations, the mask generation engine 120 obtains the gradients of the BCE loss 122 and, by moving the training image 104 or other input images corresponding to the training image 104 to the directions of the gradients, increases the BCE loss 122 (e.g., the BCE loss 122 increases away from one or more given false detections).

In some implementations, the BCE loss 122 is calculated as the average cross-entropy across a dataset that includes one or more of the detections 112. For example, a data set that includes one or more probabilities related to the detections 112 and false detections as determined by the validation engine 116 can be used as input into a logarithmic function that computes a given cross-entropy.

In some implementations, other loss functions are used. For example, classification losses such as hinge loss or multiple class support vector machines (SVM) loss, negative log likelihood, among others can be used to compute loss such as the BCE loss 122 of FIG. 1. In some cases, including some deep learning implementations, SVM may be replaced with other forms of loss functions.

The mask generation engine 120 calculates the sign of the gradient or gradient sign of the detection model 110 with respect to the input image. In some implementations, a built-in gradient algorithm from a software library can be used. For example, the software library TensorFlow is an open source software library that can be used for dataflow, differentiable programming, or machine-learning based applications. Gradient and gradient sign functions from TensorFlow can be used to aid in the calculation of the gradients discussed above and the gradient sign calculated in item 124. In some implementations, other software libraries can be used. For example, platforms such as PyTorch or MXNet among others can be used within a system such as the system 100 shown in FIG. 1.

In some implementations, the mask generation engine 120 can perform calculations related to computing the gradient of a loss function and the sign of the gradient of the loss function. For example, the calculation of the mask generation engine 120 can follow a form similar to $adv_x = x + \epsilon * \text{sign}(\nabla_x J(\theta, x, y))$ where $adv_x$ is a resulting adversarially generated image or mask, x is an original input image, y is a label related to x that includes one or more false detections among the detections 112, $\epsilon$ is used to control the level of perturbations applied to the original input image x, $\theta$ includes one or more model parameters for a model such as the detection model 110, J is a loss function that operates on elements of the input image (e.g., the training image 104, the detections 112, the false detections determined by the validation engine 116, and the detection model 110). As discussed above, the gradient, $\nabla_x$, is taken with regard to the loss function operating on elements of the system 100.

The mask generation engine 120 calculates noise based on the gradient sign calculated previously and a system defined parameter, $\epsilon$. The system defined parameter can be user or programmatically set and controls a level of magnitude of noise generated based on the input image. In some implementations, a large parameter $\epsilon$ increases an amount of noise added to the input image. In other implementations, a different scale can be used to correlate the value of a parameter, such as $\epsilon$, with a level of magnitude of noise generated based on the input image. For example, an $\epsilon$ value of 1 may be correlated with a maximum level of noise and an $\epsilon$ value of 0 may be correlated with a minimum level of noise. By changing $\epsilon$, a resulting adversarially generated image can become more visually dissimilar compared to an input image used to create the adversarially generated image.

In some implementations, a multiplicative operation can be used to combine E and the gradient sign within a calculation of noise. For example, a calculation containing elements corresponding to $\epsilon$ multiplied by elements corresponding to a calculated gradient sign can be used to produce a level of magnitude of noise generated based on the input image. In some cases, a formula version of the calculation can resemble $\epsilon * \text{sign}(\nabla_x)$ where $\text{sign}(\nabla_x)$ is a representation of gradient sign calculated and E is a user defined parameter controlling a level of magnitude of noise generated based on the input image.

The noise is added to the input image in the form of value changes to elements of the input image such as pixels. The result of adding noise to the input image is an adversarial auxiliary image.

The mask generation engine 120 adds the calculated noise to the input image to obtain an adversarial auxiliary image. The adversarial auxiliary image is a modified version of the input image that can be used, together with locations of false detection regions such as the false detection of 114a, to generate an adversarial mask.

The locations of the one or more false detections received by the mask generation engine 120 are used to obtain portions of the adversarial auxiliary image that corresponds to locations of the one or more false detections. The portions of the adversarial auxiliary image are used to create an adversarial mask 128 shown visually in visual representation 130. The adversarial mask's visual representation 130 shows a modified portion 130a of the input image as a rectangular shape cropped from the generated adversarial auxiliary image. The rectangular shape of the modified portion 130a corresponds to the location of the false detection shown in the detection region 114a. The values of pixels corresponding to the modified portion 130a can be added to a corresponding portion of a second input image, such as the new sample image 134.

In some implementations, the adversarial auxiliary image may be visually similar to the input image, such as the training image 104. For example, the adversarial auxiliary image can be generated by adjusting values associated with one or more pixels of an input image to generate a slightly modified version that results in different detections than the original input image. The adversarial auxiliary image can be a slightly modified version of the training image 104 that includes value modifications resulting in different detections being determined by a detection model. Values of the training image 104 may be modified according to one or more calculations as described herein. The adversarial auxiliary image may include the same number of pixels as the training image 104 but the values associated with pixels of each image may be different.

In some implementations, the modified portion 130a is visually similar to the original portion of the input image. For example, the modified portion 130a can appear visually similar but be modified enough to alter the detections of the detection model 110 and the detection engine 108. The amount of similarly can be controlled, in part, by the value of E discussed above.

The system 100 obtains a new sample image 134 shown visually in item 136. The new sample image 134 is an image similar to the training image 104. It contains both the detection regions 114a and 114b. However, the new sample image 134 is captured at a later time compared to the training image 104 and the detection region 114b, labeled in detection image 114 as a human, has moved and is now in a different position compared to the position shown within the training image 104.

The new sample image 134 is sent to a masked image generator 132 that also receives the adversarial mask 128. The masked image generator 132 combines the new sample image 134 with the adversarial mask 128 to generate a masked image 138 shown visually in item 140.

It should be noted that the adversarial mask 128, as shown visually in the modified portion 130a of the visual representations 130 and 140, is for visualization purposes only. In some cases, and depending on the value of a chosen parameter E, the amount the modified portion 130a is changed from the input image corresponding to the training image 104 can be either significant, as shown by the modified portion 130a, or it can resemble the detection region 114a. In some cases, the modified portion 130a is visually similar to the detection region 114a on which the modified portion 130a is based. In some cases, the modifications from the image shown in the detection region 114a to the modified portion 130a can be undetectable by humans. The modified portion 130a is modified to alter the detections of the detection engine 108 and the detection model 110. Because the detection engine 108 and the detection model 110 can be sensitive to small or obscure changes within an image, the modified portion 130a need not be modified more than what is necessary to alter the detections as discussed above.

The masked image 138 is sent to the detection engine 108. The detection engine 108 uses the detection model 110 to process the masked image 138. The detection engine 108 produces masked image detections 146 shown visually in item 148. The detection region 114a that was determined false by the validation engine 116 is no longer detected. The adversarial mask 128 prevents the detection engine 108 and the detection model 110 from detecting the element as shown in the detection region 114a. A new detection region 148a is detected within the new sample image 134. The adversarial mask 128 prevents the false detection of elements such as the false detection of the detection region 114a but it does not prevent the detection of new elements such as the detection region 148a.

By adding the adversarial mask to other images that contain a given element corresponding to the false detection in region 114a, the system 100 can prevent further false detections of the given element associated with the region 114a. For example, the tree shown in region 114a, if obtained in subsequent images taken from a different angle or input source, can be recognized as the tree corresponding to the false detection in region 114a. The system 100 can prevent false detection within the subsequent images by generating a corresponding masked image or masked images corresponding to the subsequent images that include the tree. In general, the process described can be applied to any object detected by the detection engine 108 and the detection model 110.

Figure 2:
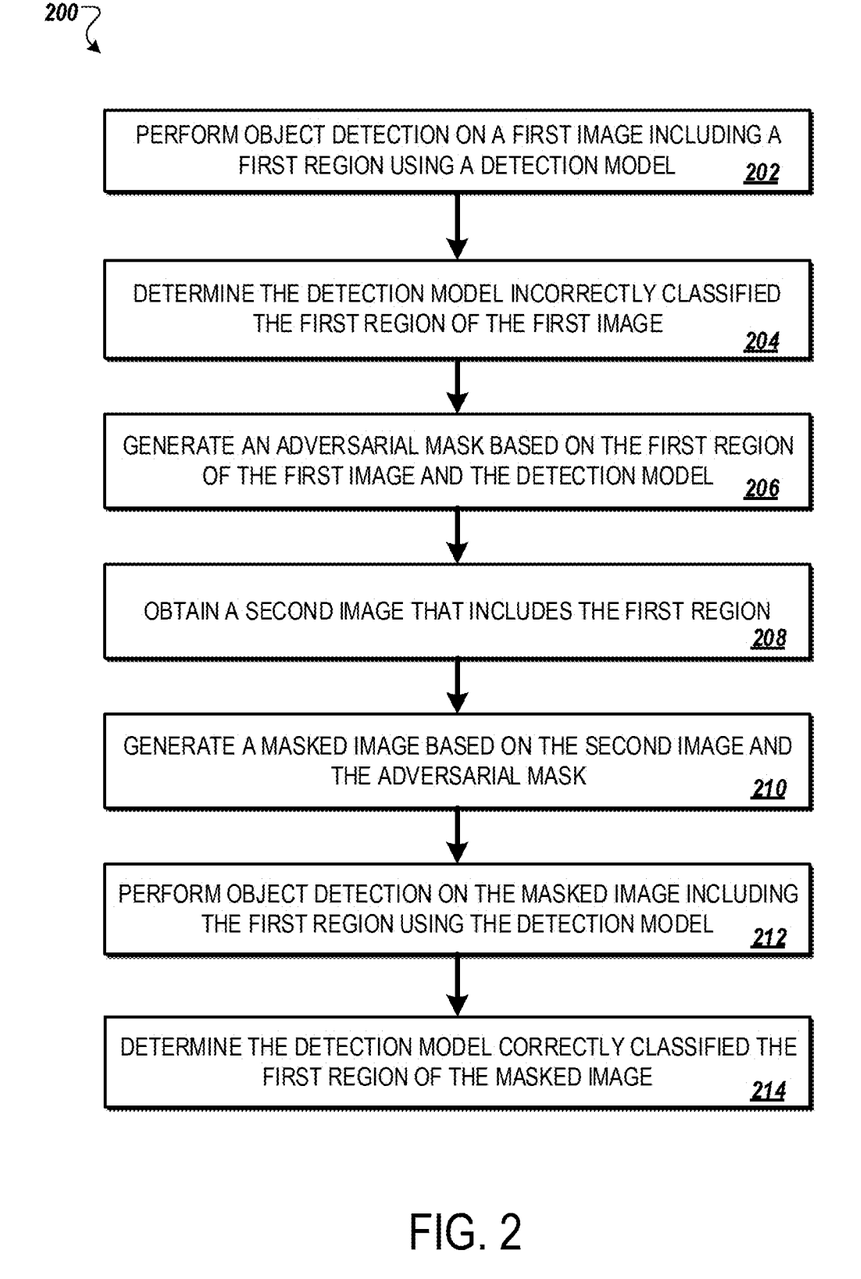
FIG. 2 is a flow diagram illustrating an example of a process for false detection removal using adversarial masks.

FIG. 2 is a flow diagram illustrating an example of a process for false detection removal using adversarial masks. The process 200 can be applied to the system 100 of FIG. 1.

The process 200 includes performing object detection on a first image including a first region using a detection model (202). For example, the training image 104 obtained from the input source 102 can be sent to the detection engine 108. The detection engine 108 uses the detection model 110 to produce the detections 112 shown visually in item 114.

The process 200 includes determining the detection model incorrectly classified the first region of the first image (204). For example, the detections 112 obtained from the detection engine 108 can be sent to the validation engine 116. The validation engine 116 can determine which detections, out of the detection regions 114a and 114b, are true and which are false.

In some implementations, the validation engine 116 includes human review. For example, the validation engine can prompt a user to review one or more detections in one or more images. The user can provide feedback that can be used by the validation engine 116 to label one or more detections as true or false.

The process 200 includes generating an adversarial mask based on the first region of the first image and the detection model (206). For example, the first region can be the detection region 114a as shown in item 114 depicting the two detections obtained by the detection engine 108. The validation engine 116 can determine that the detection region 114a is incorrect and sends corresponding data to the mask generation engine 120. The mask generation engine 120 can use the training image 104 or an image based on the training image 104 (e.g., extracted background portion of the training image 104) together with detection data obtained from the detection engine 108 or the validation engine 116 to calculate an adversarial mask. The adversarial mask can include modifications such as noise added to the input image. The adversarial mask can be a cropped portion of a modified version of the input image that is based on the training image 104.

In some implementations, an adversarial mask may be generated through one or more calculations corresponding to a detection model. For example, the mask generation engine 120 can calculate an output of a loss function for one or more pixels in the training image 104. The adversarial mask 128 can then be generated by adjusting one or more values associated with each of the one or more pixels in the training image 104 based on the output of the loss function.

In some implementations, one or more calculations used in generating an adversarial mask may include a gradient calculation. For example, the mask generation engine 120 can calculate a gradient of an output of a loss function for one or more pixels in the training image 104. The adversarial mask 128 can then be generated by adjusting one or more values associated with each of the one or more pixels in the training image 104 based on the output of the loss function as well as the gradient of the loss function.

In some implementations, one or more gradients used in adjusting one or more values of one or more pixels may be calculated. For example, one or more gradients corresponding to the effect of certain pixels on the output of a detection model, such as the detection model 110, may be obtained by back-propagating loss corresponding to a given output of the detection model 110 associated with the pixels through the detection model so that the loss will increase away from a false detection by adjusting the values of the pixels such that the corresponding image results in a detection different than an initial detection by the detection model. The values of the pixels may be adjusted in the directions of the one or more gradients determined through back-propagation as shown in item 123.

In some implementations, values associated with one or more pixels of an image may be adjusted based on one or more calculations. For example, an output of a loss function corresponding to output of a detection model, such as the detection model 110, operating on the training image 104 and determined false detections may be calculated. The output of the loss function can be used in back-propagation through the detection model to determine one or more gradients of pixels affecting a determination generated by the detection model. In order to generate the adversarial mask 128, the mask generation engine 120 can calculate a gradient indicating a change of loss based on the input of pixels corresponding to a given image, such as the training image 104. The sign of the gradient, or another element corresponding to the calculated gradient, can be multiplied by a perturbation control variable and added to values associated with pixels, such as red-green-blue (RGB) values, to generate the adversarial mask 128.

In some implementations, values may be added to values associated with one or more pixels of an image. For example, a first pixel in an image may include one or more value elements, such as a red pixel value, a green pixel value, and a blue pixel value. In some cases, a loss function output for each pixel may be computed and a corresponding adjustment may be determined based on the loss function output. The adjustment may be added to a corresponding pixel value. In some cases, pixel values range from 0 to 255. An adjustment of 5 to a red pixel value of 180 will result in a final red pixel value of 185. An adjustment of −5 will result in a final red pixel value of 175. If a pixel value is at a maximum value, such as 255, or a minimum value, such as 0, one or more actions may be performed to enable pixel adjustment. In some cases, the entire image may be adjusted in order to add more or less brightness (e.g., if one or more pixels are at a minimum value, an offset may be added to all pixels, or a subset or pixels, in the image to increase the pixel values and therefore the brightness of the image, and if one or more pixels are at a maximum, an offset may be added to all pixels, or a subset of pixels, in the image to decrease the brightness of the image). Subsequent images may be adjusted similarly in order to avoid discrepancies between images. In some cases, adjustments may be added per pixel. For example, if a pixel would be above or below a threshold after adding an adjustment, the pixel value may be set equal to the threshold. This may prevent errors in setting pixel values. In some cases, values may wrap around from a maximum to a minimum. For example, a value of 254 adjusted by an adjustment value of 3 will result in a value of 2 and not 257.

The process 200 includes obtaining a second image that includes the first region (208). For example, the new sample image 134 can be obtained from the input source 102 or other data sources including external data storages, elements of a surveillance or alarm system, user electronic devices, among others. The new sample image 134 includes the tree shown as the detection region 114*a*. The training image 104 and the new sample image 134 both contain this region.

The process 200 includes generating a masked image based on the second image and the adversarial mask (210). For example, the masked image generator 132 combines the adversarial mask 128 and the new sample image 134 to create the masked image 138. The masked image 138 contains the adversarial mask as shown in portion 130*a*. The adversarial mask 128 is a modified portion of the input image based on the training image 104 as discussed above.

The process 200 includes performing object detection on the masked image including the first region using the detection model (212). For example, the masked image 138 is sent to the detection engine 108 that uses the detection model 110 to determine one or more detections based on the received masked image 138. The detection engine 108 produces the masked image detections 146.

The process 200 includes determining the detection model correctly classified the first region of the masked image (214). For example, the masked image detections 146 shown visually in item 148, include the detection region 148*a* that is correct based on prior processing by the validation engine 116. The masked image detections 146 do not include the false detection shown as the detection region 114*a*. The adversarial mask 128 added to the new sample image 134 prevents the detection engine 108 and the detection model 110 from falsely detecting the detection region 114*a* as an animal.

In some implementations, the adversarial mask 128 can be used to promote a given detection classification. For example, the validation engine 116 can determine that an element within the training image 104 is a tree but the tree was not detected or it was incorrectly classified. The mask generation engine 120 can add noise to the input image to create a new adversarial mask that modifies how the detection engine 108 and the detection model 110 detect elements within the training image 104. The new adversarial mask can be combined with the training image 104 or another image that includes a visible portion of the tree to create a new masked image. Based on the modifications within the new adversarial mask, the detection engine 108 and the detection model 110 can correctly detect the tree based on the new masked image.

In some implementations, the detection models used in the system 100 can be forms of machine-learning networks. For example, a convolutional network used to detect objects in one or more images can be used. The detection model 110 can be a form of a convolutional network, including region-based convolutional neural network (R-CNN), Fast R-CNN, among others. Other recognition models such as you only look once (YOLO), among others, can also be used.

In some implementations, calculations on one or more masks can be used to create a given adversarial mask. For example, two masks generated from modifications to one or more input images can be averaged together to create one adversarial mask. The two masks can have overlapping regions as well as non-overlapping regions. In the case of multiple false detections in an image, a union of all masks generated from corresponding regions of input images can be used as the adversarial mask 128. In areas where multiple masks overlap, an average of values or other algorithms based on the multiple masks can be used. In some cases, averaged masks, or other combinations of one or more masks, can be used to deal with false identifications of moving or uniquely shaped elements in a visual image.

In the example of FIG. 1, the false detection corresponding to the detection region 114*a* is a tree that is falsely detected as an animal with a 0.42 confidence value. In some implementations, other elements corresponding to different physical objects or beings may be detected or falsely detected. For example, the method described in this specification can be applied, in general, to any element within a visual image to modify the detections of one or more elements within the visual image.

In some implementations, the location of one or more false detections are used to create a cropped region from one or more adversarial perturbation images. For example, two false detections in an image can result in one adversarial mask. The adversarial mask can be cropped from one or more adversarial perturbation images based on a union of locations corresponding to the two false detections within the one or more adversarial perturbation images. In some cases, the two locations can resemble boxes that bound elements in a given figure. The result of cropping the modified image can result in modified boxes in locations within an empty image frame corresponding to the locations of the two false detections.

In some implementations, one or more adversarial perturbation images are obtained by the mask generation engine 120. For example, one or more false detections can result in one or more adversarial perturbation images. In some cases, the one or more adversarial perturbation images can be cropped to obtain portions of the one or more adversarial perturbation images. The portions of the one or more adversarial perturbation images can be assembled to create a mask that is effective against the one or more false detections or can prevent or remove the one or more false detections.

In some implementations, the mask generation engine 120 generates an adversarial image and crops portions related to false detections. For example, an adversarial image can be generated based on a level noise applied to the input image as described above. The adversarial image can then be cropped to include one or more regions in which false detections were determined by an element such as the validation engine 116. The cropped portions of the adversarial image can then be used to create an adversarial mask corresponding to one or more false detections of the detections 112.

In some implementations, the mask generation engine 120 includes further processes performed by elements of the system 100. For example, the mask generation engine 120 can perform object detection within the training image 104 similar to the detection engine 108. The mask generation engine 120 can determine, based on the object detections, which detections are false and which detections are true. The mask generation engine 120 may use machine-learning algorithms or prompt another party, such as a user or other processing software or hardware, to determine which detections are false and which detections are true. The mask generation can further generate an adversarial mask based on the determined false detections.

In some implementations, the validation engine 116 uses external input to determine if a detection is true or false. For example, a user can take an image of a scene. The user can manually assign identifiers to the various elements in the scene. The manually assigned identifiers can be sent to the validation engine 116. The validation engine 116 can receive the detections 112 and cross-reference known identities with the identities of the detections 112. The validation engine 116 can determine one or more detections are false if the identities corresponding to the detections do not match the manually assigned identifiers. In some cases, high confidence values determined by the detection engine 108 in a detection with an identifier that does not agree with a manually assigned identifier, can prompt the user to double-check a given detection and corresponding identifier. In this way, the system 100 can offer robustness against mistakes during manual assignment.

In some implementations, the validation engine 116 is a software-based algorithm. For example, the validation engine 116 can be a form of detection software designed to be run less frequently than the detection engine 108. The validation engine 116 can be an intensive, or more robust, form of the detection engine 108. In some cases, the validation engine 116 can be a form of a machine-learning algorithm.

In some implementations, the validation engine 116 can use thresholds to determine relevant actions and validation determinations. For example, a system parameter can be set that determines a minimum confidence threshold for detections, below which a user is prompted to manually identify elements within a scene. A system parameter of 0.50 can be set. In this case, the detection region 114a would be below the minimum threshold and a user would receive a prompt including a visual image of the detection and be able to choose one or more appropriate identifiers or to input a new identifier. In some cases, detections that are above a certain confidence threshold can receive user feedback. The feedback, if inconsistent can result in changes to the detection engine and appropriate drop in confidence value for the given detection or similar detections. The feedback, if consistent can similarly result in changes to the detection engine and an appropriate increase in confidence value for the given detection or similar detections. In general, user input can be used to tune both the detection engine 108 and the validation engine 116.

In some implementations, more or fewer detections than those shown in the example of FIG. 1 are produced by the detection engine 108. For example, the detection engine 108 can detect three detection regions instead of the two detection regions shown in regions 114a and 114b. In some cases, specific regions of a visual image can be determined. The specific regions can be used to search for false detections. In some cases, specific false detections that may be more or less likely depending on a system environment, can be prioritized or otherwise searched.

FIG. 3 is a diagram illustrating an example of a property monitoring system. The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors 320. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 320 can also include a radio-frequency identification (RFID) sensor that identifies a particular article that includes a pre-assigned RFID tag.

The system 300 also includes one or more thermal cameras 330 that communicate with the control unit 310. The thermal camera 330 may be an IR camera or other type of thermal sensing device configured to capture thermal images of a scene. For instance, the thermal camera 330 may be configured to capture thermal images of an area within a building or home monitored by the control unit 310. The thermal camera 330 may be configured to capture single, static thermal images of the area and also video thermal images of the area in which multiple thermal images of the area are captured at a relatively high frequency (e.g., thirty images per second). The thermal camera 330 may be controlled based on commands received from the control unit 310. In some implementations, the thermal camera 330 can be an IR camera that captures thermal images by sensing radiated power in one or more IR spectral bands, including NIR, SWIR, MWIR, and/or LWIR spectral bands.

The thermal camera 330 may be triggered by several different types of techniques. For instance, a Passive Infra-Red (PIR) motion sensor may be built into the thermal camera 330 and used to trigger the thermal camera 330 to capture one or more thermal images when motion is detected. The thermal camera 330 also may include a microwave motion sensor built into the camera and used to trigger the thermal camera 330 to capture one or more thermal images when motion is detected. The thermal camera 330 may have a "normally open" or "normally closed" digital input that can trigger capture of one or more thermal images when external sensors (e.g., the sensors 320, PIR, door/window, etc.) detect motion or other events. In some implementations, the thermal camera 330 receives a command to capture an image when external devices detect motion or another potential alarm event. The thermal camera 330 may receive the command from the controller 312 or directly from one of the sensors 320.

In some examples, the thermal camera 330 triggers integrated or external illuminators (e.g., Infra-Red or other lights controlled by the property automation controls 322, etc.) to improve image quality. An integrated or separate light sensor may be used to determine if illumination is desired and may result in increased image quality.

The thermal camera 330 may be programmed with any combination of time/day schedules, monitoring system status (e.g., "armed stay," "armed away," "unarmed"), or other variables to determine whether images should be captured or not when triggers occur. The thermal camera 330 may enter a low-power mode when not capturing images. In this case, the thermal camera 330 may wake periodically to check for inbound messages from the controller 312. The thermal camera 330 may be powered by internal, replaceable batteries if located remotely from the control unit 310. The thermal camera 330 may employ a small solar cell to recharge the battery when light is available. Alternatively, the thermal camera 330 may be powered by the controller's 312 power supply if the thermal camera 330 is co-located with the controller 312.

In some implementations, the thermal camera 330 communicates directly with the monitoring server 360 over the Internet. In these implementations, thermal image data captured by the thermal camera 330 does not pass through the control unit 310 and the thermal camera 330 receives commands related to operation from the monitoring server 360.

In some implementations, the system 300 includes one or more visible light cameras, which can operate similarly to the thermal camera 330, but detect light energy in the visible wavelength spectral bands. The one or more visible light cameras can perform various operations and functions within the property monitoring system 300. For example, the visible light cameras can capture images of one or more areas of the property, which the cameras, the control unit, and/or another computer system of the monitoring system 300 can process and analyze.

The system 300 also includes one or more property automation controls 322 that communicate with the control unit to perform monitoring. The property automation controls 322 are connected to one or more devices connected to the system 300 and enable automation of actions at the property. For instance, the property automation controls 322 may be connected to one or more lighting systems and may be configured to control operation of the one or more lighting systems. Also, the property automation controls 322 may be connected to one or more electronic locks at the property and may be configured to control operation of the one or more electronic locks (e.g., control Z-Wave locks using wireless communications in the Z-Wave protocol). Further, the property automation controls 322 may be connected to one or more appliances at the property and may be configured to control operation of the one or more appliances. The property automation controls 322 may include multiple modules that are each specific to the type of device being controlled in an automated manner. The property automation controls 322 may control the one or more devices based on commands received from the control unit 310. For instance, the property automation controls 322 may interrupt power delivery to a particular outlet of the property or induce movement of a smart window shade of the property.

The system 300 also includes thermostat 334 to perform dynamic environmental control at the property. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at the property and/or environmental data at the home, e.g., at various locations indoors and outdoors at the property. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more property automation controls 322.

In some implementations, a module 337 is connected to one or more components of an HVAC system associated with the property, using the communication link 336, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robot that are capable of moving and taking actions that assist in home monitoring. For example, the robotic devices 390 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 390 may be robotic devices 390 that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a property. In these examples, the robotic devices 390 include sensors and control processors that guide movement of the robotic devices 390 within the property. For instance, the robotic devices 390 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the property and guide movement of the robotic devices 390 in a manner that avoids the walls and other obstacles.

In addition, the robotic devices 390 may store data that describes attributes of the property. For instance, the robotic devices 390 may store a floorplan of a building on the property and/or a three-dimensional model of the property that enables the robotic devices 390 to navigate the property. During initial configuration, the robotic devices 390 may receive the data describing attributes of the property, determine a frame of reference to the data (e.g., a property or reference location in the property), and navigate the property based on the frame of reference and the data describing attributes of the property. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, one or more of the thermal cameras 330 may be mounted on one or more of the robotic devices 390.

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the property. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the property. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid state electronic storage that enables the robotic devices 390 to store applications, configuration data, collected sensor data, and/or any other type of information available to the robotic devices 390.

The robotic devices 390 can be associated with one or more charging stations. The charging stations may be located at predefined home base or reference locations at the property. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact-based charging stations and/or wireless charging stations. For contact-based charging stations, the robotic devices 390 may have readily accessible points of contact that the robotic devices 390 are capable of positioning and mating with a corresponding contact on the charging station. For instance, a helicopter type robotic device 390 may have an electronic contact on a portion of its landing gear that rests on and mates with an electronic pad of a charging station when the helicopter type robotic device 390 lands on the charging station. The electronic contact on the robotic device 390 may include a cover that opens to expose the electronic contact when the robotic device 390 is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the property may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device 390 may always use a first charging station and a second robotic device 390 may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the property that is not associated with a charger. The number of community charging stations may be less than the number of robotic devices 390.

Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device 390 to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the property automation controls 322, the thermal camera 330, the thermostat 334, and the integrated security devices 380 may communicate with the controller 312 over communication links 324, 326, 328, 332, and 384. The communication links 324, 326, 328, 332, and 384 may be a wired or wireless data pathway configured to transmit signals from the sensors 320, the property automation controls 322, the thermal camera 330, the thermostat 334, and the integrated security devices 380 to the controller 312. The sensors 320, the property automation controls 322, the thermal camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, and 384 may include a local network.

The sensors 320, the property automation controls 322, the thermal camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring server 360 is one or more electronic devices configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor data, thermal image data, and other monitoring system data received from the monitoring system and perform analysis of the sensor data, thermal image data, and other monitoring system data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, thermal image, and other data to determine an activity pattern of a resident of the property monitored by the system 300. In some implementations, the monitoring server 360 may analyze the data for alarm conditions or may determine and perform actions at the property by issuing commands to one or more of the automation controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the thermal camera 330 and/or reports related to the monitoring system. Although FIG. 3 illustrates two user devices for brevity, actual implementations may include more (and, perhaps, many more) or fewer user devices.

The smart home application 342 and the smart home user interface 352 can allow a user to interface with the property monitoring system 300, for example, allowing the user to view monitoring system settings, adjust monitoring system parameters, customize monitoring system rules, and receive and view monitoring system messages.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors 320 and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system 300.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the property automation controls 322, the thermal camera 330, and the robotic devices 390. The one or more user devices 340 and 350 receive data directly from the sensors 320, the property automation controls 322, the thermal camera 330, and the robotic devices 390 (i.e., the monitoring system components) and sends data directly to the monitoring system components. The one or more user devices 340, 350 provide the appropriate interfaces/processing to provide visual surveillance and reporting.

In other implementations, the system 300 further includes network 305 and the sensors 320, the property automation controls 322, the thermal camera 330, the thermostat 334, and the robotic devices 39 are configured to communicate sensor and image data to the one or more user devices 340 and 350 over network 305 (e.g., the Internet, cellular network, etc.). In yet another implementation, the sensors 320, the property automation controls 322, the thermal camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the property automation controls 322, the thermal camera 330, the thermostat 334, and the robotic devices 390 to a pathway over network 305 when the one or more user devices 340 and 350 are farther from the sensors 320, the property automation controls 322, the thermal camera 330, the thermostat 334, and the robotic devices 390. In some examples, the system leverages GPS information from the one or more user devices 340 and 350 to determine whether the one or more user devices 340 and 350 are close enough to the monitoring system components to use the direct local pathway or whether the one or more user devices 340 and 350 are far enough from the monitoring system components that the pathway over network 305 is required. In other examples, the system leverages status communications (e.g., pinging) between the one or more user devices 340 and 350 and the sensors 320, the property automation controls 322, the thermal camera 330, the thermostat 334, and the robotic devices 390 to determine whether communication using the direct local pathway is possible. If communication using the direct local pathway is possible, the one or more user devices 340 and 350 communicate with the sensors 320, the property automation controls 322, the thermal camera 330, the thermostat 334, and the robotic devices 390 using the direct local pathway. If communication using the direct local pathway is not possible, the one or more user devices 340 and 350 communicate with the monitoring system components using the pathway over network 305.

In some implementations, the system 300 provides end users with access to thermal images captured by the thermal camera 330 to aid in decision making. The system 300 may transmit the thermal images captured by the thermal camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 330 or other cameras of the system 300). In these implementations, the thermal camera 330 may be set to capture thermal images on a periodic basis when the alarm system is armed in an "armed away" state, but set not to capture images when the alarm system is armed in an "armed stay" or "unarmed" state. In addition, the thermal camera 330 may be triggered to begin capturing thermal images when the alarm system detects an event, such as an alarm event, a door-opening event for a door that leads to an area within a field of view of the thermal camera 330, or motion in the area within the field of view of the thermal camera 330. In other implementations, the thermal camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   performing object detection on a first image that includes a first region using a detection model;
   determining the detection model incorrectly classified the first region of the first image;
   generating an adversarial mask based on the first region of the first image and the detection model;
   obtaining a second image that includes the first region;
   generating a masked image based on the second image and the adversarial mask; and
   performing object detection on the masked image including the first region using the detection model.

2. The method of claim 1, wherein the first image includes a plurality of pixels in the first region each defined by one or more values and generating the adversarial mask based on the first region of the first image and the detection model comprises:
   calculating an output of a loss function for a first pixel of the plurality of pixels; and
   adjusting one or more values corresponding to the first pixel based on the output of the loss function.

3. The method of claim 2, further comprising:
   calculating a gradient of the output of the loss function; and
   adjusting one or more values corresponding to the first pixel based on the output of the loss function and the gradient.

4. The method of claim 3, wherein calculating the gradient of the output of the loss function comprises:
   back-propagating the output of the loss function through the detection model.

5. The method of claim 3, wherein adjusting the one or more values corresponding to the first pixel based on the output of the loss function and the gradient comprises:
   generating a product by multiplying a sign of the gradient by a perturbation control variable; and
   adjusting the one or more values by adding the product of the sign of the gradient and the perturbation control variable to the one or more values.

6. The method of claim 2, wherein the one or more values include a green pixel value, a red pixel value, and a blue pixel value and adjusting the one or more values corresponding to the first pixel based on the output of the loss function comprises:
   adjusting each of the green pixel value, the red pixel value, and the blue pixel value based on the output of the loss function.

7. The method of claim 2, wherein the loss function calculates a binary cross entropy (BCE) loss and the output of the loss function represents a BCE output.

8. The method of claim 1, wherein generating the adversarial mask based on the first region of the first image and the detection model comprises:
   generating an adversarial auxiliary image as a modified version of the first image by modifying values of one or more pixels comprising the first image; and
   generating the adversarial mask by extracting a region of the adversarial auxiliary image corresponding to a location of the first region within the first image.

9. The method of claim 8, wherein the adversarial auxiliary image includes the same number of pixels as the first image.

10. The method of claim 1, wherein generating the masked image based on the second image and the adversarial mask comprises:
    adding one or more values associated with one or more pixels of the adversarial mask to one or more values associated with one or more pixels of the second image.

11. The method of claim 10, wherein adding the one or more values associated with the one or more pixels of the adversarial mask to the one or more values associated with the one or more pixels of the second image comprises:
    adding a red pixel value associated with a pixel of the adversarial mask to a red pixel value associated with a pixel of the second image;
    adding a green pixel value associated with the pixel of the adversarial mask to a green pixel value associated with the pixel of the second image; and
    adding a blue pixel value associated with the pixel of the adversarial mask to a blue pixel value associated with the pixel of the second image.

12. The method of claim 1, wherein the first image and the second image are obtained at a property by a camera.

13. The method of claim 1, wherein the detection model is a machine-learning network trained for object detection.

14. The method of claim 1, wherein the first region comprises:
    a representation of a first object that has been incorrectly classified.

15. A system comprising one or more computers and one or more storage devices on which are stored instructions that are operable, when executed by the one or more computers, to cause the one or more computers to perform operations comprising:

performing object detection on a first image that includes a first region using a detection model;

determining the detection model incorrectly classified the first region of the first image;

generating an adversarial mask based on the first region of the first image and the detection model;

obtaining a second image that includes the first region;

generating a masked image based on the second image and the adversarial mask; and performing object detection on the masked image including the first region using the detection model.

16. The system of claim 15, wherein the first image includes a plurality of pixels in the first region each defined by one or more values and generating the adversarial mask based on the first region of the first image and the detection model comprises:

calculating an output of a loss function for a first pixel of the plurality of pixels; and adjusting one or more values corresponding to the first pixel based on the output of the loss function.

17. The system of claim 16, further comprising:

calculating a gradient of the output of the loss function; and adjusting one or more values corresponding to the first pixel based on the output of the loss function and the gradient.

18. The system of claim 17, wherein calculating the gradient of the output of the loss function comprises:

back-propagating the output of the loss function through the detection model.

19. The system of claim 17, wherein adjusting the one or more values corresponding to the first pixel based on the output of the loss function and the gradient comprises:

generating a product by multiplying a sign of the gradient by a perturbation control variable; and adjusting the one or more values by adding the product of the sign of the gradient and the perturbation control variable to the one or more values.

20. A non-transitory computer storage medium encoded with instructions that, when executed by one or more computers, cause the one or more computers to perform operations comprising:

performing object detection on a first image that includes a first region using a detection model;

determining the detection model incorrectly classified the first region of the first image;

generating an adversarial mask based on the first region of the first image and the detection model;

obtaining a second image that includes the first region;

generating a masked image based on the second image and the adversarial mask; and performing object detection on the masked image including the first region using the detection model.

\* \* \* \* \*